(12) United States Patent
Liu et al.

(10) Patent No.: US 10,972,166 B2
(45) Date of Patent: Apr. 6, 2021

(54) METHOD AND APPARATUS FOR MIMO TRANSMISSION

(71) Applicant: Lenovo (Beijing) Limited, Beijing (CN)

(72) Inventors: Bingchao Liu, Beijing (CN); Chenxi Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/764,782

(22) PCT Filed: Nov. 16, 2017

(86) PCT No.: PCT/CN2017/111277
§ 371 (c)(1),
(2) Date: May 15, 2020

(87) PCT Pub. No.: WO2019/095182
PCT Pub. Date: May 23, 2019

(65) Prior Publication Data
US 2020/0366355 A1 Nov. 19, 2020

(51) Int. Cl.
*H04B 7/06* (2006.01)
*H04B 7/0404* (2017.01)
*H04B 7/0456* (2017.01)

(52) U.S. Cl.
CPC ......... *H04B 7/0628* (2013.01); *H04B 7/0404* (2013.01); *H04B 7/0473* (2013.01); *H04B 7/061* (2013.01); *H04B 7/0617* (2013.01)

(58) Field of Classification Search
CPC .... H04B 7/0404; H04B 7/0473; H04B 7/061; H04B 7/0617; H04B 7/0628
See application file for complete search history.

(56) References Cited

U.S. PATENT DOCUMENTS 6,377,558 B1 * 4/2002 Dent .................... H01Q 21/061
370/321
6,703,970 B2 * 3/2004 Gayrard ................. H01Q 1/288
342/354
7,865,152 B2 * 1/2011 Brown ..................... H04B 7/10
455/91

(Continued)

FOREIGN PATENT DOCUMENTS

CN 102651660 A 8/2012
WO 2017081685 A1 5/2017

OTHER PUBLICATIONS

R1-1716369, "UL multi-panel transmission", Ericsson, 3GPP TSG RAN WG1 NR , Nagoya, Japan, Sep. 21-28, 2017 (Year: 2017).*

(Continued)

*Primary Examiner* — James M Perez
(74) *Attorney, Agent, or Firm* — Kunzler Bean & Adamson

(57) ABSTRACT

The present disclosure relates to methods and apparatuses. According to an embodiment of the disclosure, a method comprises: transmitting the number of antenna panels equipped at a user equipment (UE), transmitting the number of panel groups (PGs), transmitting PG information indicating which antenna panel is grouped into which PG, transmitting the number of coherent PGs (CPGs), and transmitting CPG information indicating which PG is grouped into which CPG.

24 Claims, 6 Drawing Sheets

(56) References Cited

U.S. PATENT DOCUMENTS

| | | | | |
|---|---|---|---|---|
| 8,649,418 | B1* | 2/2014 | Negus | H04B 7/0486 375/211 |
| 9,692,489 | B1* | 6/2017 | Rofougaran | H04B 7/0617 |
| 9,923,712 | B2* | 3/2018 | Shirinfar | H01Q 3/26 |
| 10,014,887 | B1* | 7/2018 | Gharavi | H04B 1/04 |
| 10,116,143 | B1* | 10/2018 | Leabman | H01Q 1/007 |
| 10,122,404 | B2* | 11/2018 | Yoon | H04B 1/40 |
| 10,126,843 | B2* | 11/2018 | Chen | G06F 3/03547 |
| 10,411,943 | B2* | 9/2019 | Qian | H03F 3/68 |
| 10,560,901 | B2* | 2/2020 | Jung | H04W 72/0473 |
| 10,568,041 | B2* | 2/2020 | MolavianJazi | H04W 52/08 |
| 10,660,044 | B2* | 5/2020 | MolavianJazi | H04W 52/08 |
| 10,660,048 | B2* | 5/2020 | MolavianJazi | H04B 7/088 |
| 10,660,077 | B2* | 5/2020 | MolavianJazi | H04W 52/346 |
| 10,686,502 | B1* | 6/2020 | Zhao | H04B 17/318 |
| 10,686,573 | B2* | 6/2020 | Jung | H04L 1/1854 |
| 10,735,162 | B2* | 8/2020 | Jung | H04W 24/10 |
| 10,736,046 | B2* | 8/2020 | MolavianJazi | H04W 52/367 |
| 2010/0208844 | A1* | 8/2010 | Uhl | H04B 7/10 375/308 |
| 2012/0218911 | A1* | 8/2012 | Zhu | H04B 7/024 370/252 |
| 2012/0220333 | A1* | 8/2012 | Zhu | H04B 7/024 455/525 |
| 2013/0012144 | A1* | 1/2013 | Besoli | H01Q 9/27 455/85 |
| 2013/0022152 | A1* | 1/2013 | McGowan | H01Q 21/08 375/299 |
| 2014/0146902 | A1* | 5/2014 | Liu | H01Q 21/28 375/260 |
| 2016/0099613 | A1* | 4/2016 | Bell | H04B 1/3838 307/104 |
| 2016/0218425 | A1* | 7/2016 | Mohamadi | H01Q 21/065 |
| 2016/0231835 | A1* | 8/2016 | Chen | G06F 3/04883 |
| 2016/0359533 | A1* | 12/2016 | Obara | H04B 7/0456 |
| 2017/0033847 | A1* | 2/2017 | Lomayev | H04B 7/10 |
| 2017/0033853 | A1* | 2/2017 | Kim | H04B 7/0452 |
| 2017/0093475 | A1* | 3/2017 | Smith | H04B 7/022 |
| 2017/0366982 | A1* | 12/2017 | Chang | H01Q 3/2605 |
| 2018/0069292 | A1* | 3/2018 | Rofougaran | H01Q 1/2283 |
| 2018/0115083 | A1* | 4/2018 | Besoli | H01Q 21/0025 |
| 2018/0183503 | A1* | 6/2018 | Rahman | H04W 72/042 |
| 2018/0234120 | A1* | 8/2018 | Gharavi | H04B 7/0408 |
| 2018/0316407 | A1* | 11/2018 | Rahman | H04B 7/0478 |
| 2018/0321369 | A1* | 11/2018 | Cohen | G01S 3/783 |
| 2019/0068267 | A1* | 2/2019 | Rahman | H04B 7/0408 |
| 2019/0149299 | A1* | 5/2019 | Lee | H04B 7/0456 370/329 |
| 2019/0182001 | A1* | 6/2019 | Lee | H04W 52/34 |
| 2019/0372732 | A1* | 12/2019 | Faxer | H04L 5/0048 |
| 2019/0373614 | A1* | 12/2019 | Yum | H04W 24/10 |
| 2020/0083939 | A1* | 3/2020 | Park | H04W 72/042 |
| 2020/0119776 | A1* | 4/2020 | Lorca Hernando | H04W 28/06 |
| 2020/0119785 | A1* | 4/2020 | Varatharaajan | H04W 52/42 |
| 2020/0119790 | A1* | 4/2020 | Rao | H04B 7/0617 |
| 2020/0162133 | A1* | 5/2020 | Harrison | H04L 5/0048 |
| 2020/0212978 | A1* | 7/2020 | Zhao | H04B 7/0691 |
| 2020/0213053 | A1* | 7/2020 | Faxer | H04L 5/0023 |
| 2020/0275260 | A1* | 8/2020 | Huang | H04L 5/0048 |
| 2020/0287602 | A1* | 9/2020 | Park | H04L 5/0051 |
| 2020/0336182 | A1* | 10/2020 | Faxer | H04B 7/065 |
| 2020/0343950 | A1* | 10/2020 | Zhu | H04L 5/005 |
| 2020/0366355 | A1* | 11/2020 | Liu | H04B 7/061 |

OTHER PUBLICATIONS

CATT, "Further discussion on codebook based transmission for UL", R1-1717807, 3GPP TSG RAN WG1 Meeting 90bis, Oct. 9-13, 2017, pp. 1-5.

PCT/CN2017/111277, "International Search Report and the Written Opinion of the International Search Authority" ISA/CN, State Intellectual Property Office of the P.R. China, dated Jul. 5, 2018, pp. 1-7.

* cited by examiner

METHOD AND APPARATUS FOR MIMO TRANSMISSION

TECHNICAL FIELD

The present disclosure is directed to wireless communication technology and, more particularly, to providing information for Multiple-Input Multiple-Output (MIMO) transmission.

BACKGROUND

Wireless communication systems are widely known in which base stations (also known as eNBs or gNBs, depending on the network type) communicate with mobile devices (also known as user equipments (UEs)) which are within range of the base stations. Each base station divides its available bandwidth, such as frequency and time resources, into different resource allocations for different UEs. For example, UE can be configured with one or more sounding reference signal (SRS) resources for uplink (UL) transmission.

MIMO is one technique used for data transmission in wireless communication systems. A MIMO communication system can employ multiple antennas at the transmitter and/or at the receiver (often at both) to enhance the data capacity achievable between the transmitter and the receiver. Every transmit (TX) antenna in a MIMO system is usually provided with at least one RF or TX chain, which may have separate or shared transmitters or TX components. However, there will be different coherent transmission capabilities among different TX chains. This leads to different UL coherent transmission capabilities, such as full/non/partial-coherent transmission between SRS ports of one or more SRS resources.

Thus, there is a need for providing coherent transmission capabilities of the TX chains of the UEs to the base station to facilitate the configuration of the codebook or coherent transmission for the UEs.

SUMMARY OF THE DISCLOSURE

According to an embodiment of the present disclosure, a method comprises: transmitting the number of antenna panels equipped at a user equipment (UE), the number of antenna panels being at least one; transmitting the number of panel groups (PGs), wherein each PG includes one antenna panel or more than one antenna panels sharing at least one transmit (TX) component of the UE; transmitting PG information indicating which antenna panel is grouped into which PG; transmitting the number of coherent PGs (CPGs), wherein each CPG includes at least two PGs and the antenna panels in the at least two PGs of each CPG are coherent; and transmitting CPG information indicating which PG is grouped into which CPG.

According to another embodiment of the present disclosure, a method comprises: receiving the number of antenna panels equipped at a user equipment (UE), the number of antenna panels being at least one; receiving the number of panel groups (PGs), wherein each PG includes one antenna panel or more than one antenna panels sharing at least one transmit (TX) component of the UE; receiving PG information indicating which antenna panel is grouped into which PG; receiving the number of coherent PGs (CPGs), wherein each CPG includes at least two PGs and the antenna panels in the at least two PGs of each CPG are coherent; and receiving CPG information indicating which PG is grouped into which CPG.

Embodiments of the present disclosure also provide apparatuses for performing the above methods.

In an embodiment of the present disclosure, an apparatus comprises one or more transmitters, and one or more antenna panels, wherein each antenna panel corresponds to at least one transmit (TX) component of the one or more transmitters. The one or more transmitters: transmit the number of the one or more antenna panels; transmit the number of panel groups (PGs), wherein each PG includes one antenna panel or more than one antenna panels sharing at least one TX component; transmit PG information indicating which antenna panel is grouped into which PG; transmit the number of coherent PGs (CPGs), wherein each CPG includes at least two PGs and the antenna panels in the at least two PGs of each CPG are coherent; and transmit CPG information indicating which PG is grouped into which CPG.

Embodiments of the present disclosure also provide non-transitory computer-readable media having stored thereon computer-executable instructions to cause a processor to implement the above methods.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
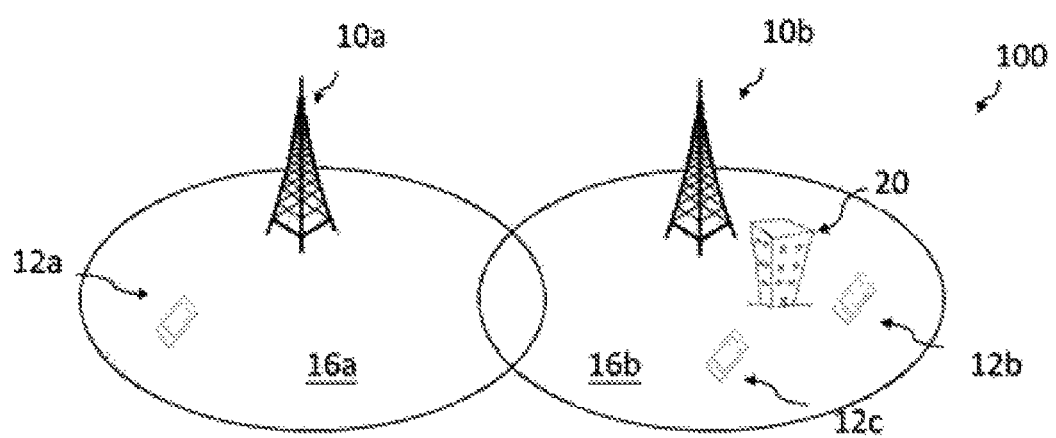
FIG. 1 illustrates a schematic wireless communication system according to an embodiment of the disclosure.

FIG. 1 illustrates a wireless communication system 100 according to an embodiment of the disclosure.

As shown in FIG. 1, the wireless communication system 100 includes a plurality of base stations 10 including base stations 10a and 10b, and a plurality of UEs 12 including UEs 12a, 12b and 12c. The plurality of base stations 10 may be based on the standards of long-term evolution (LTE), LTE-Advanced (LTE-A), new radio (NR), or other suitable standards. For example, the plurality of base stations 10 may be a plurality of eNBs, or a plurality of gNBs. In an embodiment of the disclosure, the plurality of base stations 10 may be controlled by a control unit (not shown). Each base station 10 may define one or more cells 16, such as cell 16a or 16b, and each cell 16 may support mobility management through the radio resource control (RRC) signaling. A group of cells 16 may form a radio access network-based (RAN-based) notification area (RNA). The UE 12 may be a computing device, a wearable device, and a mobile device, etc. The UEs with reference numerals 12a, 12b and 12c may represent the same UE moving in different locations within the coverage of the cell 16a or 16b, or different UEs. Persons skilled in the art should understand that as the 3GPP and the communication technology develop, the terminologies recited in the specification may change, which should not affect the principle of the disclosure.

Figure 2:
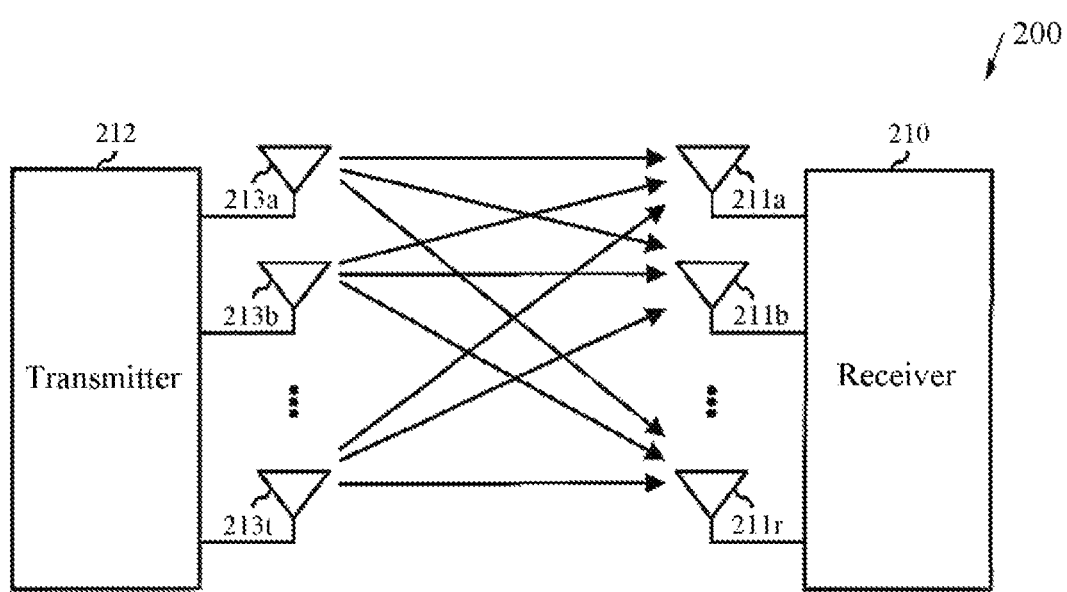
FIG. 2 illustrates a schematic MIMO communication system according to an embodiment of the disclosure.

FIG. 2 shows a MIMO communication system 200 including a receiver 210 and a transmitter 212 according to an embodiment of the disclosure. For downlink (DL) transmission, receiver 210 may be part of a UE, and transmitter 212 may be part of a base station. For uplink (UL) transmission, receiver 210 may be part of a base station, and transmitter 212 may be part of a UE. In an embodiment, a UE or a base station may include one or more receivers and one or more transmitters as shown in FIG. 2.

In FIG. 2, the transmitter 212 includes multiple TX antennas or antenna panels (i.e., antennas 213a, 213b, . . . and 213t), and the receiver 210 includes multiple receive (RX) antennas or antenna panels (i.e., antennas 211a, 211b, . . . and 211r). The TX/RX antenna panel may have separate or shared TX/RX components, such as Digital-to-Analog Converter (DAC) and Phase-Locked Loop (PLL). When TX/RX antenna panels have shared TX/RX components, only one panel in these TX/RX panels can transmit/receive at a time (by means of panel switching or panel selection). When TX/RX antenna panels have separate TX/RX components, these TX/RX panels can transmit/receive independently. Moreover, coherent transmission can be supported if the antenna panels are all coherent or calibrated. However, only non-coherent or partial-coherent transmission can be applied when those antenna panels are not coherent or calibrated.

In an embodiment, the transmitter 212 may utilize TX beamforming technique. Possible TX beamforming schemes include analog, digital, and hybrid TX beamforming. Different TX beamforming schemes have different capabilities. For example, for analog beamforming, only one TX chain is equipped for one panel, and thus only one SRS port can be configured for one SRS resource of a corresponding panel. For digital or hybrid beamforming, multiple TX chains are equipped for one panel, and thus multiple SRS ports can be configured for one SRS resource of a corresponding panel. There will be different coherent transmission capabilities among different TX chains. In particular, for digital or hybrid beamforming, different SRS ports may have different coherent levels. Also, there will be different coherent transmission capabilities between different antenna panels. This leads to different coherent transmission capabilities, such as full/non/partial-coherent transmission between different SRS ports of one or more SRS resources. Therefore, there is a need for providing coherent transmission capabilities of the TX chains to the base station to facilitate the configuration of the codebook or coherent transmission for the UE. In the following, proposed schemes are presented in details.

Figure 3:
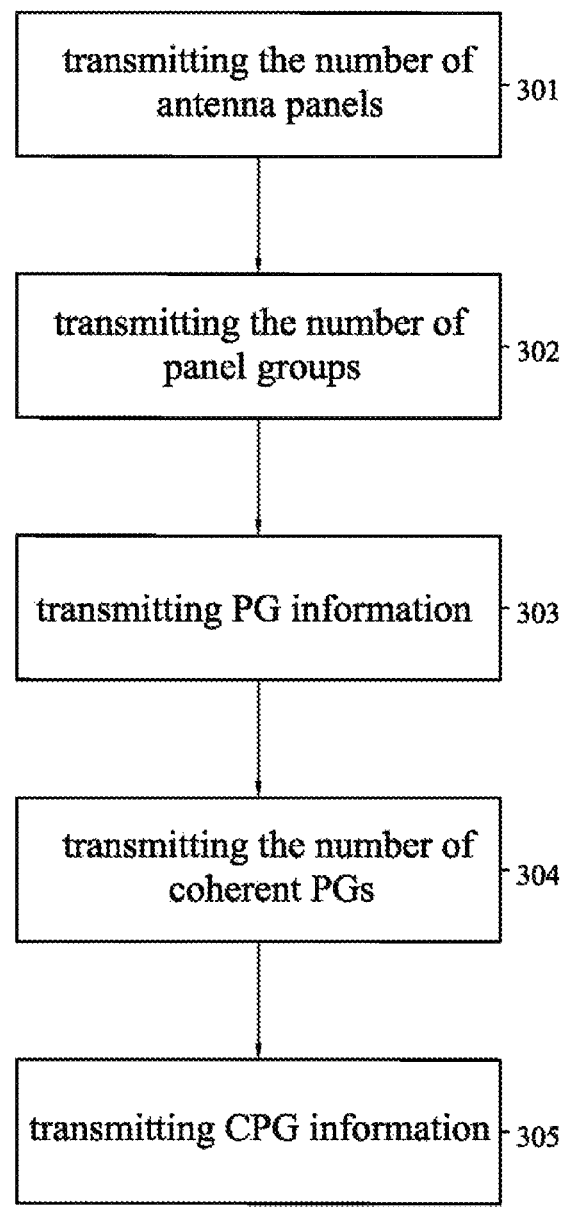
FIG. 3 illustrates a flow chart for a method for transmitting coherent information according to an embodiment of the disclosure.

FIG. 3 illustrates a flow chart for a method 300 for transmitting coherent information according to an embodiment of the disclosure.

As shown in FIG. 3, in step 301, the number of antenna panels equipped at a UE is transmitted. In an embodiment, the number of the antenna panels is at least one. In step 302, the number of panel groups (PGs) is transmitted. In an embodiment, each PG includes one antenna panel or more than one antenna panels sharing at least one TX component of the UE. In step 303, PG information indicating which antenna panel is grouped into which PG is transmitted. In step 304, the number of coherent PGs (CPGs) is transmitted. In an embodiment, each CPG includes at least two PGs, and the antenna panels in the at least two PGs of each CPG are coherent or calibrated. In step 305, CPG information indicating which PG is grouped into which CPG is transmitted. In an embodiment, the above information regarding the UE capability maybe signaled to a base station (e.g., gNB) through RRC messages.

In an embodiment, the method 300 may further transmit an indicator of beamforming architecture of the UE. For example, the indicator may indicate that the UE employs an analog beamforming architecture. In another example, the indicator may indicate that the UE employs a hybrid or digital beamforming architecture. In the latter case, the method 300 may further transmit the number of SRS ports. When the UE employs a hybrid or digital beamforming architecture, each antenna panel may support a plurality SRS ports. The method 300 then further transmits, for each antenna panel, the number of coherent SRS port groups (CSPGs). In an embodiment, each CSPG includes at least two SRS ports that are coherent. The method 300 also transmits, for each CSPG, CSPG information indicating which SRS port is grouped into which CSPG.

In an example, assuming that a UE employs an analog beamforming architecture, the US may then signal the following coherent information to a base station (e.g., gNB):

{
  Indicator for beamforming architecture: analog beamforming;
  Number of panels;
  Number of PGs;
  Panels in each PG;
  Number of CPG;
  Panel groups in each CPG;
}

As mentioned above, in analog beamforming, each panel only has one TX chain, and a UE may be equipped with multiple panels. The transmission of the above information thus allows the UE to support high rank and coherent transmission. For example, "Panels in each PG" indicates the panels that share TX components (such as DAC and PLL). That is, panels sharing any TX component are defined as a PG, where two panels in a same PG cannot transmit together, and different panels in different PGs can transmit together. If all panels have separated TX chains, each panel will belong to a single PG. Moreover, "Panel groups in each CPG" indicates the panels/PGs that are calibrated and can transmit coherently. Panels in different CPGs are not calibrated and cannot transmit coherently.

In an embodiment, assuming that 4 panels are equipped at the UE side with analog beamforming, wherein panel 1 ($P_1$) and panel 2 ($P_2$) share one TX chain, panel 3 ($P_3$) and panel 4 ($P_4$) share another TX chain, and these two TX chains are calibrated or coherent, the above coherent information from the UE to the gNB may be implemented as follows:

```
{
  Indicator for beamforming architecture: analog beamforming;
  Number of panels=4;
  Number of panel groups=2;
  PG$_1$={P$_1$, P$_2$}, PG$_2$={P$_3$, P$_4$};
  Number of CPG =1;
  CPG$_1$={PG$_1$, PG$_2$}
}
```

In another embodiment, assuming that all 4 panels in the above embodiment have separated TX chains, wherein TX chains of panel 1 and panel 2 are coherent, TX chains of panel 3 and panel 4 are coherent, TX chains of panel 1/2 and TX chains of panel 3/4 are not coherent, the above coherent information from the UE to the gNB may be implemented as follows:

```
{
  Indicator for beamforming architecture: analog beamforming;
  Number of panels=4;
  Number of panel groups=4;
  PG$_1$={P$_1$}, PG$_2$={P$_2$}, PG$_3$={P$_3$}, PG$_4$={P$_4$};
  Number of CPG =2;
  CPG$_1$={PG$_1$, PG$_2$}, CPG$_2$={PG$_3$, PG$_4$}
}
```

In another example, assuming that a UE employs a hybrid and digital beamforming architecture, the US may then signal the following coherent information to a base station (e.g., gNB):

```
{
  Indicator for beamforming architecture: hybrid/digital beamforming;
  Number of panels;
  Number of SRS ports;
  Number of CSPG for each panel;
  SRS ports in each CSPG;
  Number of panel groups;
  Panels in each panel groups;
  Number of CPG;
  Panel groups in each CPG;
}
```

As mentioned above, in hybrid and digital beamforming, each panel may have multiple TX chains, which correspond to multiple SRS ports. Since different TX chains or different SRS ports may have different coherent levels, the UE may signal one or more CSPGs, wherein all SRS ports in a same CSPG are calibrated and can transmit coherently, while any two SRS ports in different CSPGs are not calibrated and cannot transmit coherently. Similar to analog beamforming architecture, the UE should also signal the information regarding the PGs and CPGs.

In an embodiment, assuming that 4 panels are equipped at the UE side, and each panel has 4 TX chains corresponding to 4 SRS ports, the coherent information from the UE to the gNB may be implemented as follows:

```
{
Indicator for beamforming architecture: hybrid/digital beamforming;
Number of panels = 4;
Number of SRS ports = 16;
Number of CSPG for panel 1=2;
CSPG$_1^1$={SRS port 0, SRS port 1}, CSPG$_2^1$={SRS port 2, SRS port 3};
Number of CSPG for panel 2=2;
CSPG$_1^2$={SRS port 4, SRS port 5}, CSPG$_2^2$={SRS port 6, SRS port 7};
Number of CSPG for panel 3=2;
```
-continued
```
CSPG$_1^3$={SRS port 8, SRS port 9}, CSPG$_2^3$={SRS port 10, SRS port 11};
Number of CSPG for panel 4=2;
CSPG$_1^4$={SRS port 12, SRS port 13}, CSPG$_2^4$={SRS port 14, SRS port 15};
Number of panel groups=2;
PG$_1$={P$_1$, P$_2$}, PG$_2$={P$_3$, P$_4$};
Number of CPG =1;
CPG$_1$={PG$_1$, PG$_2$}
}
```

The above information indicates:
1. SRS ports 0-3 belong to panel 1, SRS port 0 and SRS port 1 are coherent, SRS port 2 and SRS port 3 are coherent, and SRS port 0/1 and SRS port 2/3 are not coherent.
2. SRS ports 4-7 belong to panel 2, SRS port 4 and SRS port 5 are coherent, SRS port 6 and SRS port 7 are coherent, and SRS port 4/5 and SRS port 6/7 are not coherent.
3. SRS ports 8-11 belong to panel 3, SRS port 8 and SRS port 9 are coherent, SRS port 10 and SRS port 11 are coherent, and SRS port 8/9 and SRS port 10/11 are not coherent.
4. SRS ports 12-15 belong to panel 4, SRS port 12 and SRS port 13 are coherent, SRS port 14 and SRS port 15 are coherent, and SRS port 12/13 and SRS port 14/15 are not coherent.
5. Panel 1 and panel 2 share some of their TX components, and panel 3 and panel 4 share some of their TX components.
6. TX chains of panel 1/2 and panel 3/4 are coherent.

In another embodiment, still assuming that 4 panels are equipped at the UE side, and each panel has 4 TX chains corresponding to 4 SRS ports, the coherent information from the UE to the gNB may be implemented as follows:

```
{
Indicator for beamforming architecture: hybrid/digital beamforming;
Number of panels = 4;
Number of SRS ports = 16;
Number of CSPG for panel 1=1;
CSPG$_1^1$={SRS port 0, SRS port 1, SRS port 2, SRS port 3}
Number of CSPG for panel 2=1;
CSPG$_1^2$={SRS port 4, SRS port 5, SRS port 6, SRS port 7};
Number of CSPG for panel 3=1;
CSPG$_1^3$={SRS port 8, SRS port 9, SRS port 10, SRS port 11};
Number of CSPG for panel 4=1;
CSPG$_1^4$={SRS port 12, SRS port 13, SRS port 14, SRS port 15};
Number of panel groups=4;
PG$_1$={P$_1$}, PG$_2$={P$_2$}, PG$_3$={P$_3$}, PG$_4$={P$_4$};
Number of CPG =2;
CPG$_1$={PG$_1$, PG$_2$}, CPG$_2$={PG$_3$, PG$_4$};
}
```

In this case, the above information indicates:
1. SRS ports 0-3 belong to panel 1, and all these four (4) SRS ports are coherent.
2. SRS ports 4-7 belong to panel 2, and all these 4 SRS ports are coherent.
3. SRS ports 8-11 belong to panel 3, and all these 4 SRS ports are coherent.
4. SRS ports 12-15 belong to panel 4, and all these 4 SRS ports are coherent.
5. All of 4 panels have separated TX chains.
6. TX chains of panel 1 and panel 2 are coherent, TX chains of panel 3 and panel 4 are coherent, and TX chains of panel 1/2 and TX chains of panel 3/4 are not coherent.

In an embodiment, the method 300 may further comprise grouping antenna panels sharing at least one TX component of the UE into corresponding PGs.

In another embodiment, the method 300 may further comprise grouping coherent PGs into corresponding CPGs.

In yet another embodiment, the method 300 may further comprise grouping coherent SRS ports into corresponding CSPGs.

In still another embodiment, the method 300 may further comprise in response to receiving a transmitted precoding matrix indicator (TPMI), transmitting Physical Uplink Shared Channel (PUSCH) with precoders corresponding to the TPMI.

Figure 4:
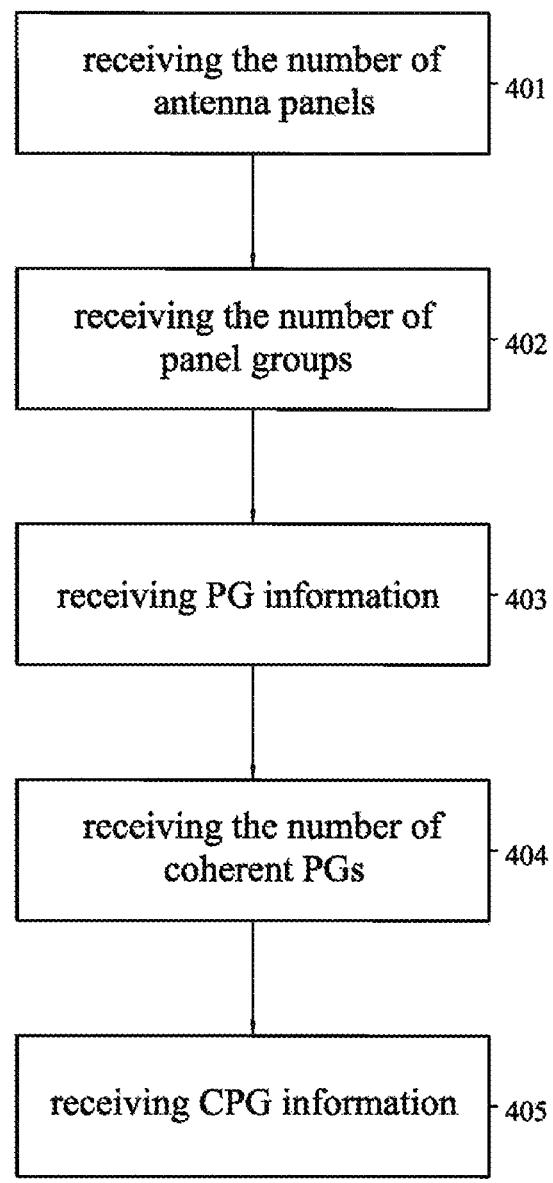
FIG. 4 illustrates a flow chart for a method for receiving coherent information according to an embodiment of the disclosure.

FIG. 4 illustrates a flow chart for a method 400 for receiving coherent information according to an embodiment of the disclosure.

As shown in FIG. 4, in step 401, the number of antenna panels equipped at a UE is received. In an embodiment, the number of the antenna panels is at least one. In step 402, the number of PGs is received. In an embodiment, each PG includes one antenna panel or more than one antenna panels sharing at least one TX component of the UE. In step 403, PG information indicating which antenna panel is grouped into which PG is received. In step 404, the number of CPGs is received. In an embodiment, each CPG includes at least two PGs, and the antenna panels in the at least two PGs of each CPG are coherent. In step 405, CPG information indicating which PG is grouped into which CPG is received.

In an embodiment, the method 400 may further comprise receiving an indicator of beamforming architecture of the UE. For example, the indicator may indicate that the UE employs an analog beamforming architecture. In another example, the indicator may indicate that the UE employs a hybrid or digital beamforming architecture. In the latter case, the method 400 may further comprise receiving the number of SRS ports. As mentioned above, when the UE employs a hybrid or digital beamforming architecture, each antenna panel may support a plurality SRS ports. The method 400 then further receives, for each antenna panel, the number of CSPGs. In an embodiment, each CSPG includes at least two SRS ports that are coherent. The method 400 also receives, for each CSPG, CSPG information indicating which SRS port is grouped into which CSPG.

The above coherent transmission capability information may be received by a base station (e.g., gNB) through RRC messages. In response to receiving the above information, the base station may allocate SRS resources based on the received coherent transmission capability information. For example, the base station may determine the UL SRS beam (UL TX beam/precoder) used for PUSCH and indicate the selected SRS beam to UE through an SRS resource indicator (SRI). SRI is a key component of both codebook-based and non-codebook-based UL MIMO. For codebook based UL MIMO, an additional TX precoder may be applied on top of the selected SRS beams.

In an embodiment, the method 400 further comprises in response to receiving the PG information, determining an SRI for UE UL transmission in a transmission time interval (TTI) based at least on selecting no more than one antenna panel from a PG at a time. In another embodiment, the method 400 further comprises transmitting the SRI to the UE.

In an embodiment, the method 400 further comprises in response to receiving the CPG information, determining a TPMI for UE UL transmission in a TTI based at least on not configuring coherent transmission between antenna panels in different CPGs. In another embodiment, the method 400 further comprises in response to receiving the CSPG information, determining the TPMI for UE UL transmission in a TTI based at least on not configuring coherent transmission between SRS ports in different CSPGs. In yet another embodiment, the method 400 further comprises transmitting the TPMI to the UE.

Figure 5:
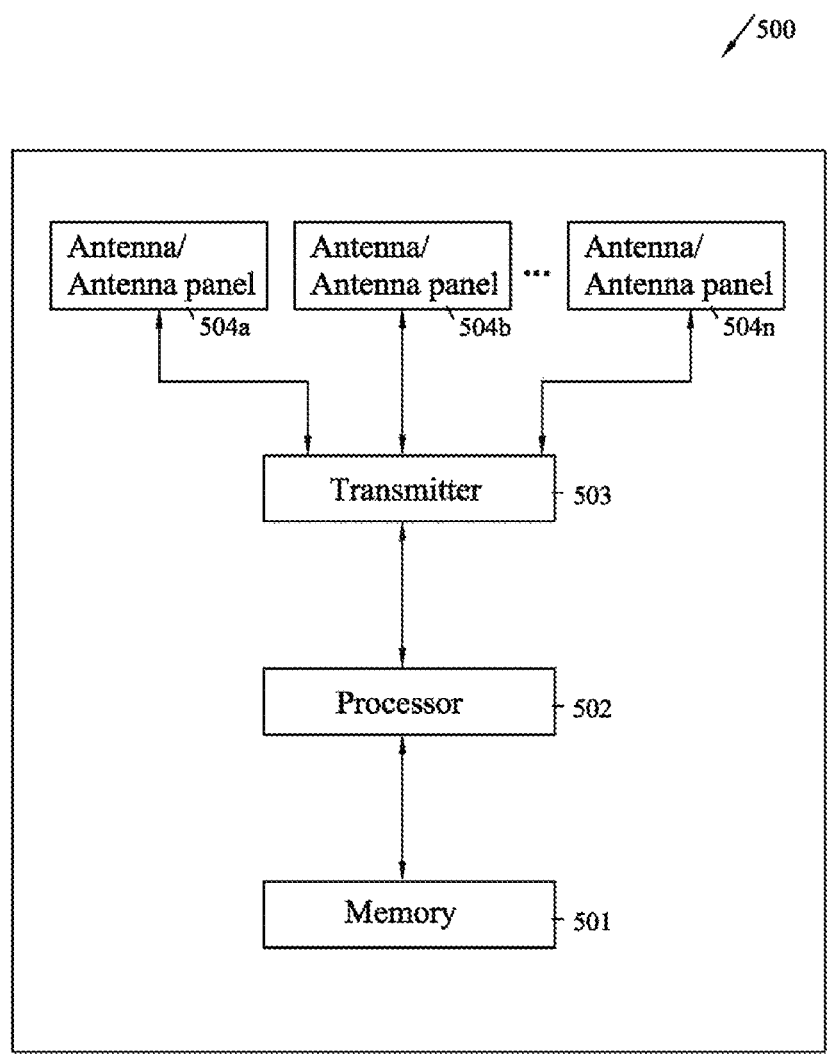
FIG. 5 illustrates a block diagram of an apparatus for transmitting coherent information according to an embodiment of the disclosure.

FIG. 5 illustrates a block diagram of an apparatus 500 for transmitting coherent information according to an embodiment of the disclosure. The apparatus 500 may perform method 300 as described above. The apparatus 500 may be a UE such as a computing device, a wearable device, and a mobile device. The apparatus 500 can communicate with a base station.

As shown in FIG. 5, the apparatus 500 may include a memory 501, a processor 502, a transmitter 503, and a plurality of antennas or antenna panels including antennas/antenna panels 504a, 504b, . . . and 504n. The transmitter 503 may comprise TX components such as DAC and/or PLL (not shown). Although in this figure, elements such as memory, processor, and transmitter are described in the singular, the plural is contemplated unless limitation to the singular is explicitly stated.

In an embodiment, the apparatus 500 may comprise one or more transmitters and one or more antenna panels, wherein each antenna panel corresponds to at least one TX component of the one or more transmitters. The one or more transmitters may transmit the number of the one or more antenna panels; transmit the number of PGs, wherein each PG includes one antenna panel or more than one antenna panels sharing at least one TX component; transmit PG information indicating which antenna panel is grouped into which PG; transmit the number of CPGs, wherein each CPG includes at least two PGs and the antenna panels in the at least two PGs of each CPG are coherent; and transmit CPG information indicating which PG is grouped into which CPG.

In another embodiment, the one or more transmitters may further transmit an indicator of beamforming architecture of the apparatus. For example, the indicator may indicate that the apparatus employs an analog beamforming architecture. In another example, the indicator may indicate that the apparatus employs a hybrid or digital beamforming architecture. In the latter case, each antenna panel may support a plurality of SRS ports. The one or more transmitters may further transmit the number of SRS ports supported by the one or more antenna panels. The one or more transmitters then further transmit, for each antenna panel, the number of CSPGs. In an embodiment, each CSPG includes at least two SRS ports that are coherent. The one or more transmitters also transmit, for each CSPG, CSPG information indicating which SRS port is grouped into which CSPG.

In yet another embodiment, the processor 502 is coupled to one or more transmitters, and groups antenna panels sharing at least one TX component of the apparatus into corresponding PGs.

In still another embodiment, the processor 502 is coupled to one or more transmitters, and groups coherent PGs into corresponding CPGs.

In yet still another embodiment, the processor 502 is coupled to one or more transmitters, and groups coherent SRS ports into corresponding CSPGs.

In still yet another embodiment, the one or more transmitters further transmit, in response to receiving a TPMI, PUSCH with precoders corresponding to the TPMI.

Figure 6:
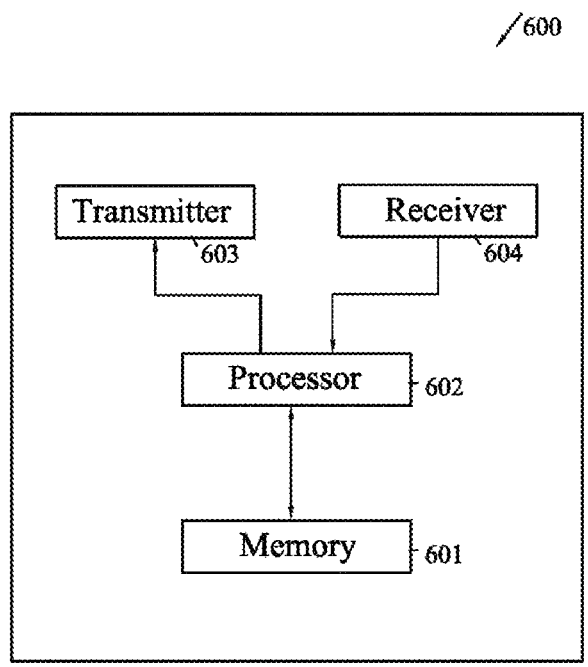
FIG. 6 illustrates a block diagram of an apparatus for receiving coherent information according to an embodiment of the disclosure.

FIG. 6 illustrates a block diagram of an apparatus 600 for receiving coherent information according to an embodiment of the disclosure. The apparatus 600 may perform method 400 as described above. The apparatus 600 may be a base station that can communicate with UE(s).

As shown in FIG. 6, the apparatus 600 may include a memory 601, a processor 602, a transmitter 603, and a receiver 604. Although in this figure, elements such as memory, processor, transmitter, and receiver are described in the singular, the plural is contemplated unless limitation to the singular is explicitly stated. In an embodiment, the processor 602 may perform method 400 as described above.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

The following is what is claimed:

1. A method, comprising:
transmitting the number of antenna panels equipped at a user equipment, the number of antenna panels being at least one;
transmitting the number of panel groups, wherein each panel group includes one antenna panel or more than one antenna panels sharing at least one transmit component of the user equipment;
transmitting panel group information indicating which antenna panel is grouped into which panel group;
transmitting the number of coherent panel groups, wherein each coherent panel group includes at least two panel groups and the antenna panels in the at least two panel groups of each coherent panel group are coherent; and
transmitting coherent panel group information indicating which panel group is grouped into which coherent panel group.

2. The method of claim 1, further comprising:
transmitting an indicator of beamforming architecture of the user equipment.

3. The method of claim 2, wherein the indicator indicates that the user equipment employs an analog beamforming architecture.

4. The method of claim 2, wherein the indicator indicates that the user equipment employs a hybrid or digital beamforming architecture.

5. The method of claim 4, further comprising:
transmitting the number of sounding reference signal ports, wherein each antenna panel supports a plurality of sounding reference signal ports;
transmitting, for each antenna panel, the number of coherent sounding reference signal port groups, wherein each coherent sounding reference signal port group includes at least two sounding reference signal ports that are coherent; and
transmitting, for each coherent sounding reference signal port group, coherent sounding reference signal port group information indicating which sounding reference signal port is grouped into which coherent sounding reference signal port group.

6. The method of claim 5, further comprising:
grouping coherent sounding reference signal ports into corresponding coherent sounding reference signal port groups.

7. The method of claim 1, further comprising:
grouping antenna panels sharing at least one transmit component of the user equipment into corresponding panel groups.

8. The method of claim 1, further comprising:
grouping coherent panel groups into corresponding coherent panel groups.

9. A method, comprising:
receiving the number of antenna panels equipped at a user equipment, the number of antenna panels being at least one;
receiving the number of panel groups, wherein each panel group includes one antenna panel or more than one antenna panels sharing at least one transmit component of the user equipment;
receiving panel group information indicating which antenna panel is grouped into which panel group;
receiving the number of coherent panel groups, wherein each coherent panel group includes at least two panel groups and the antenna panels in the at least two panel groups of each coherent panel group are coherent;
receiving coherent panel group information indicating which panel group is grouped into which coherent panel group;
transmitting a sounding reference signal resource indicator to the user equipment; and
transmitting a transmitted precoding matrix indicator to the user equipment.

10. The method of claim 9, further comprising:
receiving an indicator of beamforming architecture of the user equipment.

11. The method of claim 10, wherein the indicator indicates that the user equipment employs an analog beamforming architecture.

12. The method of claim 10, wherein the indicator indicates that the user equipment employs a hybrid or digital beamforming architecture.

13. The method of claim 12, further comprising:
receiving the number of sounding reference signal ports, wherein each antenna panel supports a plurality of sounding reference signal ports;
receiving, for each antenna panel, the number of coherent sounding reference signal port groups, wherein each coherent sounding reference signal port group includes at least two sounding reference signal ports that are coherent; and
receiving, for each coherent sounding reference signal port group, coherent sounding reference signal port group information indicating which sounding reference signal port is grouped into which coherent sounding reference signal port group.

14. The method of claim 13, further comprising:
in response to receiving the coherent sounding reference signal port group information, determining a transmitted precoding matrix indicator for user equipment uplink transmission in a transmission time interval based at least on not configuring coherent transmission between sounding reference signal ports in different coherent sounding reference signal port groups.

15. The method of claim 9, further comprising:
in response to receiving the panel group information, determining the sounding reference signal resource indicator for user equipment uplink transmission in a transmission time interval based at least on selecting no more than one antenna panel from a panel group at a time.

16. The method of claim 9, further comprising:
in response to receiving the coherent panel group information, determining the transmitted precoding matrix indicator (TPMI) for user equipment uplink transmission in a transmission time interval based at least on not configuring coherent transmission between antenna panels in different coherent panel groups.

17. An apparatus, comprising:
one or more transmitters; and
one or more antenna panels, wherein each antenna panel corresponds to at least one transmit component of the one or more transmitters;
wherein the one or more transmitters:
transmit the number of the one or more antenna panels;
transmit the number of panel groups, wherein each panel group includes one antenna panel or more than one antenna panels sharing at least one transmit component;
transmit panel group information indicating which antenna panel is grouped into which panel group;
transmit the number of coherent panel groups, wherein each coherent panel group includes at least two panel groups and the antenna panels in the at least two panel groups of each coherent panel group are coherent; and
transmit coherent panel group information indicating which panel group is grouped into which coherent panel group.

18. The apparatus of claim 17, wherein the one or more transmitters further transmit an indicator of beamforming architecture of the apparatus.

19. The apparatus of claim 18, wherein the indicator indicates that the apparatus employs an analog beamforming architecture.

20. The apparatus of claim 18, wherein the indicator indicates that the apparatus employs a hybrid or digital beamforming architecture.

21. The apparatus of claim 20, wherein each antenna panel supports a plurality sounding reference signal ports, and wherein the one or more transmitters further:
transmit the number of sounding reference signal ports supported by the one or more antenna panels;
transmit, for each antenna panel, the number of coherent sounding reference signal port groups, wherein each coherent sounding reference signal port group includes at least two sounding reference signal ports that are coherent; and
transmit, for each coherent sounding reference signal port group, coherent sounding reference signal port group information indicating which sounding reference signal port is grouped into which coherent sounding reference signal port group.

22. The apparatus of claim 21, further comprising a processor coupled to the one or more transmitters, and wherein the processor groups coherent sounding reference signal ports into corresponding coherent sounding reference signal port groups.

23. The apparatus of claim 17, further comprising a processor coupled to the one or more transmitters, and wherein the processor groups antenna panels sharing at least one transmit component of the apparatus into corresponding panel groups.

24. The apparatus of claim 17, further comprising a processor coupled to the one or more transmitters, and wherein the processor groups coherent panel groups into corresponding coherent panel groups.

\* \* \* \* \*